J. H. SAWYER.
HAY PRESS.
APPLICATION FILED MAY 3, 1910.

968,496.

Patented Aug. 23, 1910.

3 SHEETS—SHEET 1.

WITNESSES:
Samuel E. Wade.
C. E. Trainer

INVENTOR
JOHN H. SAWYER
BY Munn & Co.
ATTORNEYS

J. H. SAWYER.
HAY PRESS.
APPLICATION FILED MAY 3, 1910.
968,496.
Patented Aug. 23, 1910.
3 SHEETS—SHEET 2.
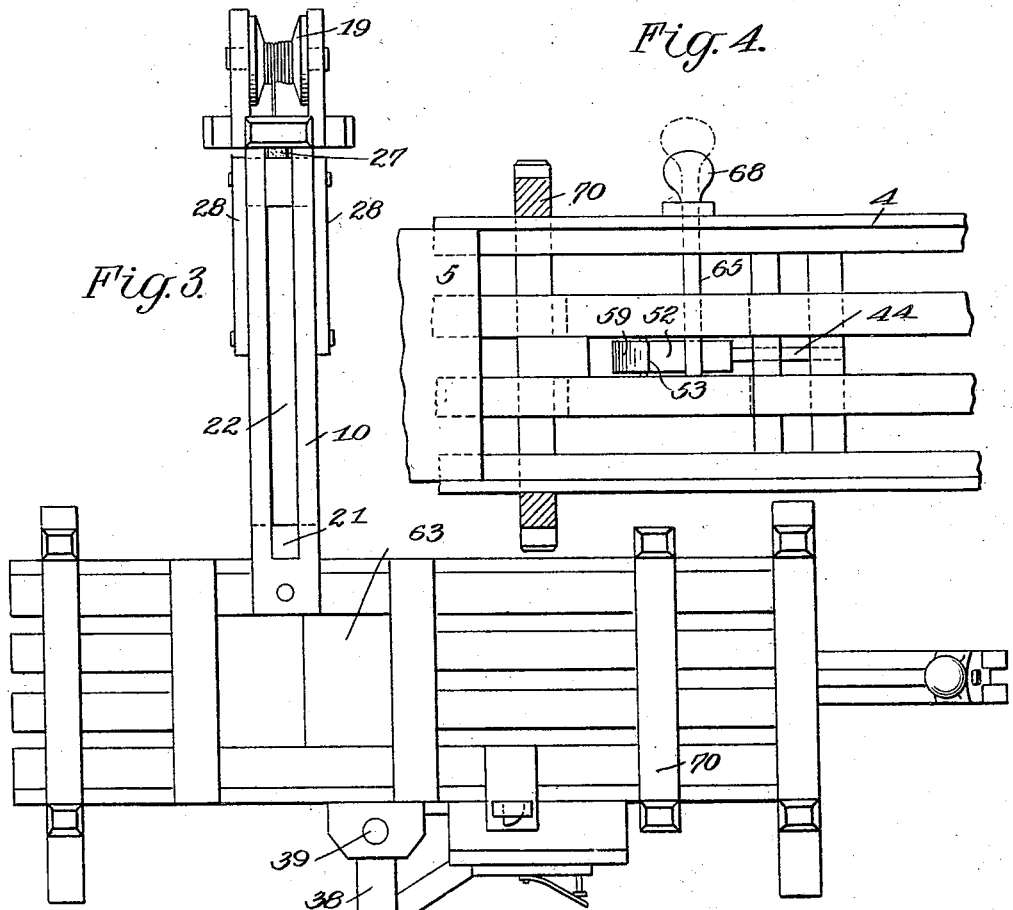
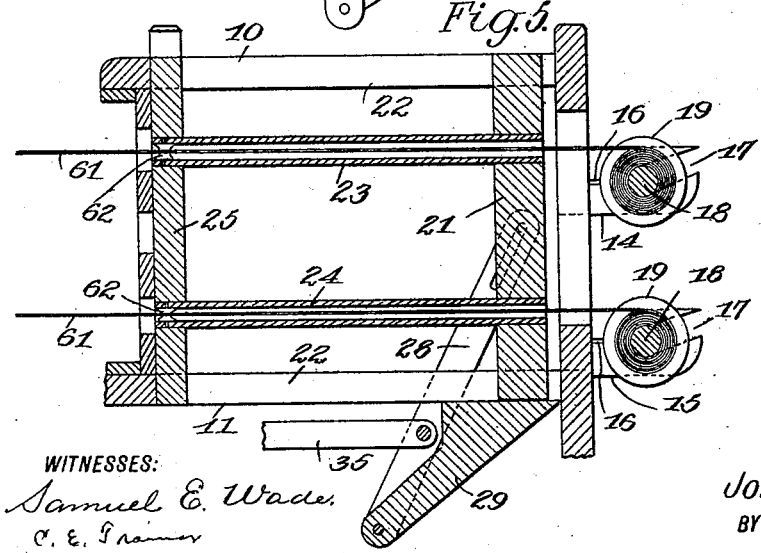
WITNESSES:
Samuel E. Wade.
INVENTOR
John H. Sawyer
BY
ATTORNEYS

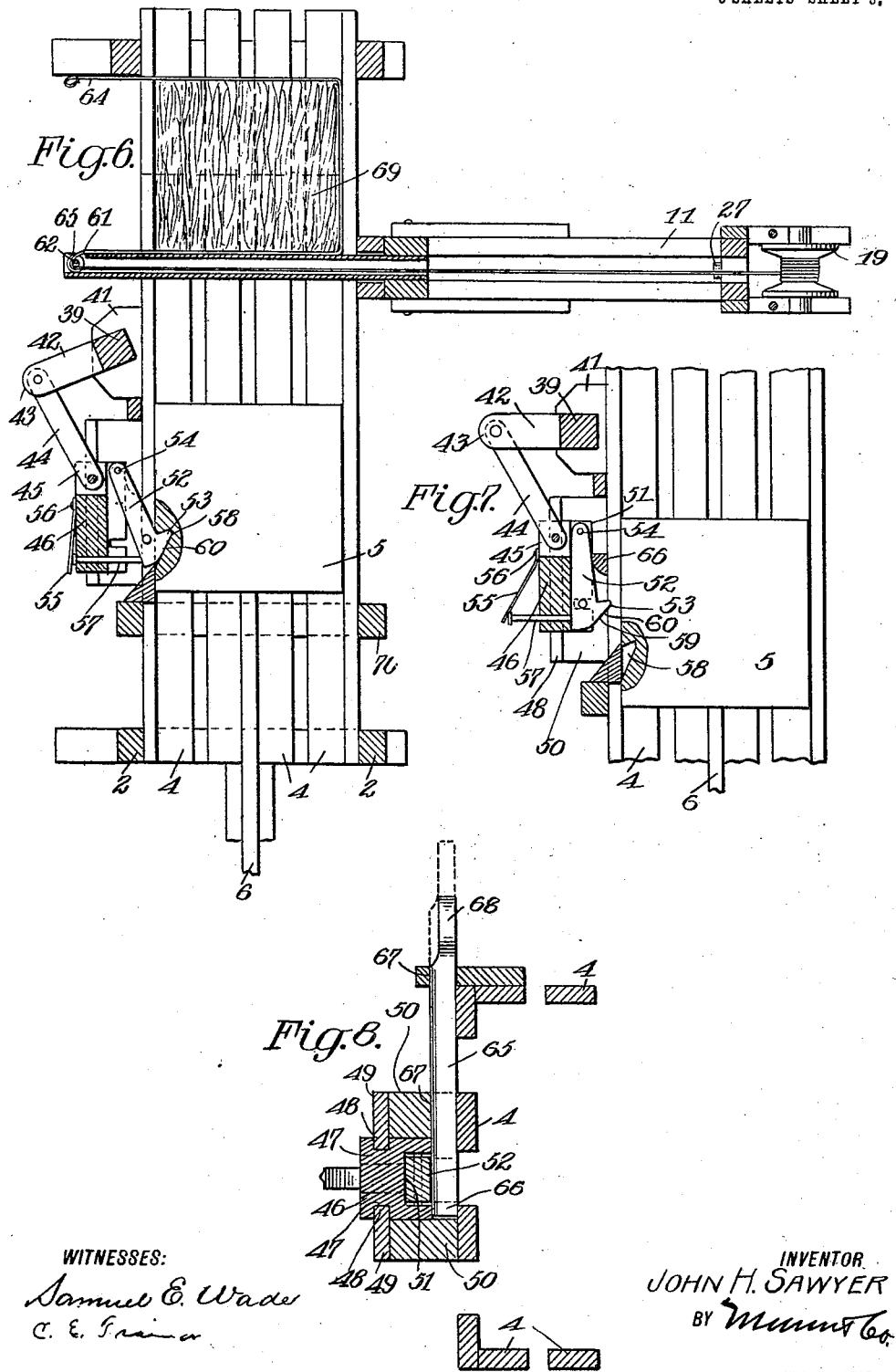

UNITED STATES PATENT OFFICE.

JOHN H. SAWYER, OF LEXINGTON, KENTUCKY, ASSIGNOR OF ONE-HALF TO JOHN N. MARKEY, OF WEST UNION, WEST VIRGINIA.

HAY-PRESS.

968,496.  Specification of Letters Patent.  Patented Aug. 23, 1910.

Application filed May 3, 1910. Serial No. 559,066.

*To all whom it may concern:*

Be it known that I, JOHN H. SAWYER, a citizen of the United States, and a resident of Lexington, in the county of Fayette and State of Kentucky, have made certain new and useful Improvements in Hay - Presses, of which the following is a specification.

My invention is an improvement in hay presses, and consists in certain novel constructions, and combinations of parts, hereinafter described and claimed.

The object of the invention is to provide a press of the character specified, of simple construction and easily operated, and wherein the baling wires will be automatically placed at the completion of the pressing operation by the reverse movement of the plunger.

Figure 1:
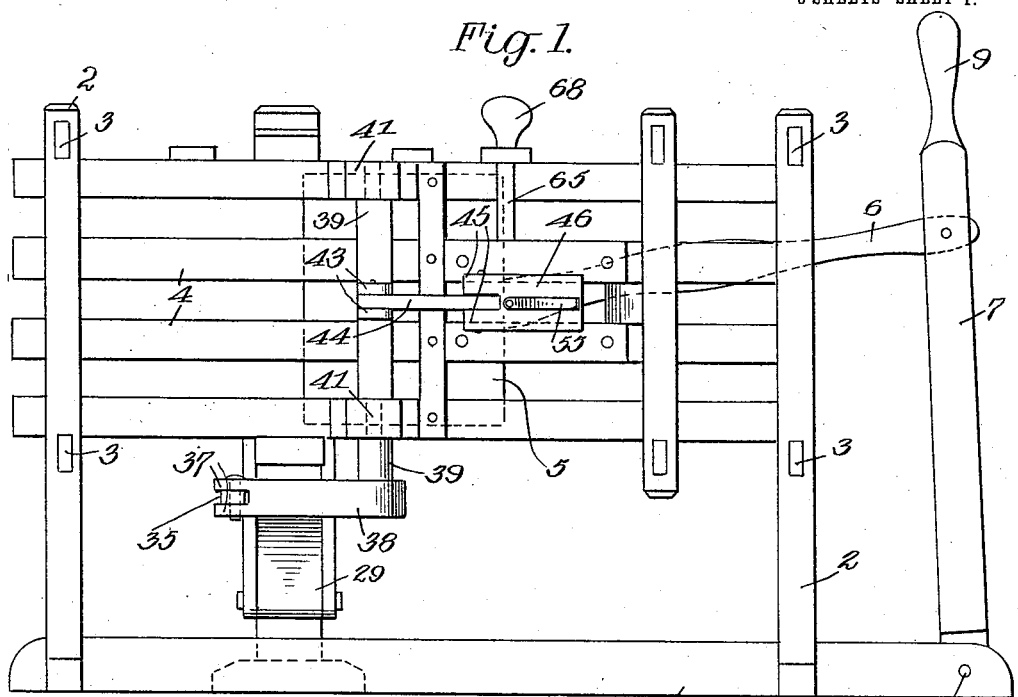
Figure 2:
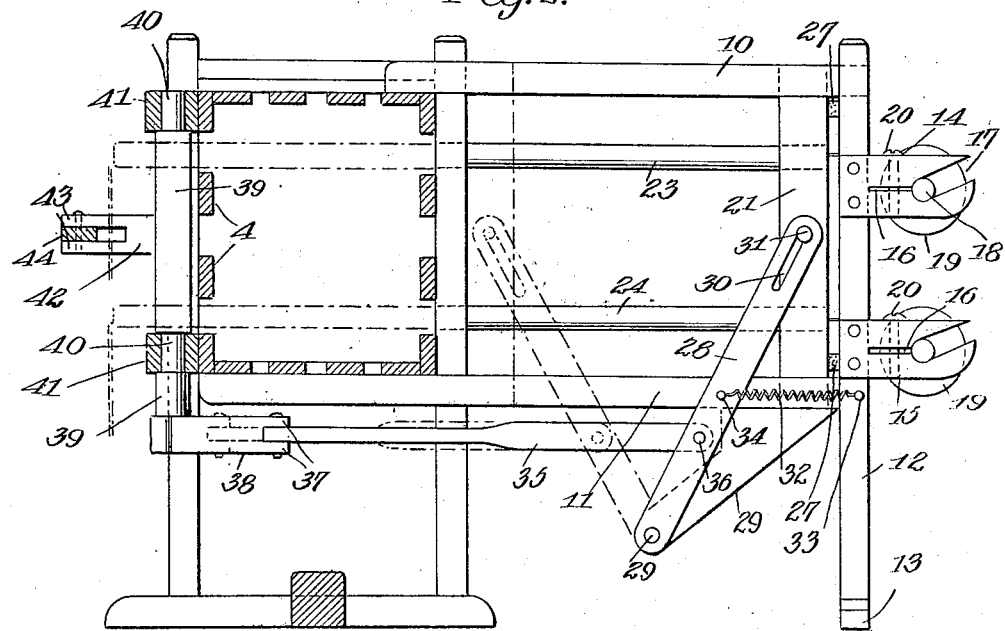

Referring to the drawings forming a part hereof, Figure 1 is a side view of the improvement, Fig. 2 is a transverse section, Fig. 3 is a plan view, Fig. 4 is a partial longitudinal section, Fig. 5 is a longitudinal section of the needle carriage, Fig. 6 is a longitudinal section of the improvement, showing the plunger in one position, Fig. 7 is a partial sectional view showing the plunger in another position, and Fig. 8 is a partial vertical section on the line of the carriage operating mechanism.

The present embodiment of the invention consists of a base plate 1, having near each corner thereof, an upright 2, and the uprights at each end are connected near their tops by spaced cross bars 3, which are preferably mortised through the upright as shown. The pressing chamber is formed by slats 4 arranged in spaced relation longitudinally of the bars on the cross bars, and on the portions of the uprights between the cross bars.

A plunger 5 is slidable in the pressing chamber, and is connected by a link 6, with a lever 7, intermediate its ends, and the lever is pivoted to the end of the base at 8, and is provided at its upper free end with a grip 9. Near one end of the pressing chamber, upper and lower bars 10 and 11 extend laterally, and are connected at their outer ends with an upright 12. The upright is provided at its lower end with a foot 13, and adjacent to each of the bars 10 and 11 with outwardly extending pairs 14 and 15 of brackets.

Each member of each pair of brackets is longitudinally slotted from its outer end at 16, and is provided with an open bearing 17, at the outer end of the slot, for receiving the trunnion 18 of a reel 19. A screw 20 is passed through each bracket vertically, and extends across the slot, as shown in Fig. 2, to adjust the tightness of the bearings on the trunnions of the reels.

Each of the bars 10 and 11 is longitudinally slotted at 22, and a block 21 is slidable longitudinally of the bars, the ends of the block being received in the slots, and upper and lower hollow needles 23 and 24 are connected with the block, and extend laterally therefrom, one needle 23 being near the upper end of the block, and the other 24 being near the lower end. The needles extend entirely through the block Fig. 5, and a bar 25 is arranged in the slot 22 adjacent to the pressing chamber, the said bar having openings through which the needles pass.

Cushions 27 of elastic material are arranged on the uprights 12 for engagement by the block when in its outermost position, and the block is moved in the guideways formed by the slots 22, by means of a lever 28 pivoted by one end to a bracket arm 29 extending from the bar 11, and having at the other a longitudinal slot 30, in which moves a pin 31 on the block.

A spring 32 is connected at one end to a pin 33 on the upright 12, and at the other to a pin 34 on the lever, and acts normally to hold the lever in the position shown in Fig. 2, with the block in its outermost position. The lever is moved in the opposite direction by a link 35 pivoted at 36 to the lever intermediate its ends, and at the other between a pair of ears 37, on an arm 38, extending laterally from a rock shaft 39.

The rock shaft is provided with cylindrical portions 40, which are journaled in bearings 41 on the pressing chamber, and between the bearings, the shaft is provided with a lateral arm 42, having at its outer end spaced ears 43, between which is pivoted one end of a link 44, the other end being pivoted between a pair of ears 45 on a block 46 to be described.

The block 46 Figs. 6, 7 and 8 is provided on its upper and lower faces with longitudinal grooves 47 which are engaged by the extended edges 48 of plates 49 secured to blocks 50 held on the pressing chamber, the extended edges acting as guides for the block, and being in fact flanges on the blocks. The block is longitudinally recessed at 51 on its inner face, and a lever 52 provided with a nose 53 is pivoted in the recess at 54.

The lever is normally pressed inward by a spring 55 secured at one end to the block at 56, and engaging with its free end a pin 57 passing through the block and engaging the lever as shown in Figs. 6 and 7. The plunger 5 is provided with a notch 58 for engagement by the nose of the lever, the said lever and nose forming a spring operated catch for locking the block to the plunger.

The end of the lever is beveled as shown at 59 and is adapted to engage a cam 60 held on the pressing chamber to release the catch, when the block reaches the end of its travel in one direction. The reels 19 are provided with baling wire 61, which passes from the respective reels through the needles, to the opposite side of the chamber, grooved pulleys 62 being journaled transversely in the needles at their inner ends to lessen friction on the wires.

An opening 63 is provided in the upper side of the pressing chamber through which the hay or other material to be baled is introduced, and the wires 61, pass from the needles to the opposite end of the pressing chamber from the plunger, then across the end of the chamber, and outside of the same as shown at 64 in Fig. 6. The side of each needle is cut away adjacent to the pulley as shown at 65, in the same figure, so that the wire may move freely.

While the bale is being completed by repeated reciprocations of the plunger, the material being normally added in instalments, the lever 52 is held in the position shown in Fig. 7, by means of a vertically movable bar 65 having a cam shaped lower end 66, which is introduced between the lever and the adjacent side of the pressing chamber. The bar is slidable in bearings 67 on the chamber, and is provided with a handle or grip 68.

After the bale is completed, as above stated, and just before the plunger begins its return movement, the bar is lifted, and the spring 55 presses the lever 52 inwardly, and the nose 53 engages with the notch 58, as shown in Fig. 6, and the block 46 is carried backward with the plunger. This movement of the block oscillates the shaft 39, and by means of the link 35, the lever 28 is swung against the resistance of the spring 32 into the position shown in dotted lines in Fig. 2.

The block 21 or needle carriage is moved inwardly and the needles are pressed transversely of the end of the bale 69, as shown in Fig. 6, bringing the wires into position to be cut from the reels, and connected with the free ends held at 64. The continued movement of the plunger 5 rearward causes the bevel surface 59 of the lever to engage the cam 60, and the lever is swung outwardly against the resistance of the spring, thus releasing the block 46 from the plunger.

The spring 32 returns the needle carriage to the position shown in full lines in Fig. 2, and the movement of the lever returns the other parts. The bar 65 is again depressed, the wires rearranged, and the press is in condition to form a new bale. The reels 19 when empty may be removed from the bearings and replaced by filled ones. The pressing chamber is also reinforced by a rectangular frame 70 at the end adjacent to the lever 7.

It will be understood that the frame of the press may be of any desired shape, and of any desired construction, and that the plunger will in practice be power operated. The movement of the plunger is continuous, and the connection and disconnection of the plunger and block takes place without any checking of the movement of the plunger.

I claim—

1. A press comprising a pressing chamber, a plunger movable therein, means for reciprocating the plunger, a pair of superposed spaced laterally extending guide bars, a needle carriage movable between the bars, needles connecting to the carriage and extending toward the pressing chamber, a reel journaled adjacent to each needle, means for reciprocating the needle carriage toward and from the pressing chamber, to pass the needles therethrough, said means comprising a rock shaft, having arms at substantially a right angle with respect to each other, a link connecting one arm with the needle carriage, a block slidable longitudinally of the pressing chamber, a connection between the other arm of the rock shaft and the block, a catch on the block, the plunger having a recess for engagement by the catch, a spring normally pressing the catch into engagement with the recess, and manually operated means for holding the catch out of engagement with the recess.

2. A press comprising a pressing chamber, a plunger movable therein, means for reciprocating the plunger, a pair of superposed spaced laterally extending guide bars, a needle carriage movable between the bars, needles connected to the carriage and extending toward the pressing chamber, a reel journaled adjacent to each needle, means for reciprocating the needle carriage toward and from the pressing chamber, to pass the needles therethrough, said means comprising a rock shaft having arms at substantially a right angle with respect to each other, a link connecting one arm with the needle carriage, a block slidable longitudinally of the pressing chamber, a connection between the other arm of the rock shaft and the block, means on the block for engaging the plunger to cause the block to move with the plunger on its rearward movement, a spring normally holding said means in engagement with the plunger, and manually operated means for holding said means out of engagement.

3. A press comprising a pressing chamber, a plunger movable therein, means for reciprocating the plunger, a pair of superposed spaced laterally extending guide bars, a needle carriage movable between the bars, needles connected to the carriage and extending toward the pressing chamber, a reel journaled adjacent to each needle, means for reciprocating the needle carriage toward and from the pressing chamber to pass the needles therethrough, said means comprising a rock shaft having a plurality of arms, a connection between one arm and the needle carriage, a block connected with the other arm and slidable longitudinally of the pressing chamber, means on the block for engaging the plunger on its rearward movement to cause the block to move therewith, and manually operated means for holding the said means out of engagement.

4. A press comprising a pressing chamber, a plunger movable therein, means for reciprocating the plunger, a pair of superposed spaced laterally extending guide bars, a needle carriage movable between the bars, needles connected to the carriage and extending toward the pressing chamber, a reel journaled adjacent to each needle, means for reciprocating the needle carriage toward and from the pressing chamber, to pass the needles therethrough, said means comprising a block movable longitudinally of the pressing chamber, a connection between the block and the carriage for reciprocating the carriage when the block moves longitudinally, normally operative means for connecting the plunger and the block on the rearward movement of the plunger, and for releasing the block and the plunger on the forward movement of the plunger, and manually operated means for holding said means in inoperative position.

5. A press comprising a pressing chamber, a plunger movable therein, means for reciprocating the plunger, a pair of superposed spaced laterally extending guide bars, a needle carriage movable between the bars, needles connected to the carriage and extending toward the pressing chamber, a reel journaled adjacent to each needle, means for reciprocating the needle carriage toward and from the pressing chamber to pass the needles therethrough, said means comprising a movable block, normally operative means for connecting the block to the plunger when the plunger moves rearwardly, and manually operated means for holding said means in inoperative position.

6. A press comprising a pressing chamber, a plunger movable therein, means for reciprocating the plunger, a pair of superposed spaced laterally extending guide bars, a needle carriage movable between the bars, needles connected to the carriage and extending toward the pressing chamber, a reel journaled adjacent to each needle, means for reciprocating the needle carriage toward and from the pressing chamber to pass the needle therethrough, said means comprising a rock shaft having a plurality of arms, a connection between one arm and the carriage, normally operative means for connecting the other arm with the plunger on its rearward movement, and normally operated means for holding said means in inoperative position.

7. A press comprising a pressing chamber, a plunger therein, a needle carriage provided with a plurality of wire carrying needles movable laterally toward and from the chamber to pass the needles transversely thereof, means for moving the carriage comprising a rock shaft having a plurality of arms, a connection between one arm and the carriage, a block slidable longitudinally of the chamber, a connection between the other arm of the shaft and the block, a catch on the block for engaging the plunger on its rearward movement, a spring normally holding the catch in engagement with the plunger, and a slidable bar for disengaging the catch.

8. A press comprising a pressing chamber, a plunger therein, a needle carriage provided with a plurality of wire carrying needles movable laterally toward and from the chamber to pass the needles transversely thereof, means for moving the carriage comprising a rock shaft having a plurality of arms, a connection between one arm and the carriage, a block slidable longitudinally of the chamber, a connection between the other arm of the shaft and the block, a catch on the block for engaging the plunger on its rearward movement, a spring normally holding the catch in engagement with the plunger, and manual means for holding the catch out of engagement with the plunger.

9. A press comprising a pressing chamber, a plunger therein, a needle carriage provided with a plurality of wire carrying needles movable laterally toward and from the chamber to pass the needles transversely thereof, a rock shaft having a plurality of arms, a connection between one arm and the carriage for swinging the same, a block slidable on the chamber, a connection between the other arm and the block, a normally operative catch locking the block to the plunger on the rearward movement thereof, manually operated means for holding the catch in inoperative position, and a spring for returning the carriage.

10. A press comprising a pressing chamber, a plunger therein, a needle carriage provided with a plurality of wire carrying needles movable laterally toward and from the chamber to pass the needles transversely, a block slidably mounted on the chamber, a connection between the block and the carriage for moving said carriage, normally operative means on the block for engaging the plunger on its rearward movement to cause the block to move therewith, and means for holding said means in inoperative position.

11. A press comprising a pressing chamber, a plunger therein, a needle carriage provided with a plurality of wire carrying needles movable laterally toward and from the chamber to pass the needles transversely, a block slidably mounted on the chamber, a connection between the block and the carriage for moving said carriage, normally operative means for locking the block to the plunger when it moves rearwardly, and means for holding said means in inoperative position.

12. In a press of the character specified, a pressing chamber, a plunger movable therein, means for reciprocating the plunger, means for passing a plurality of baling wires transversely of the chamber, means for operating the said means, comprising a slidable block, normally operative means for locking the block to the plunger on its rearward movement, and means for holding said means in inoperative position.

13. In a press of the character specified, a pressing chamber, a plunger movable therein, means for reciprocating the plunger, means for passing a plurality of baling wires transversely of the chamber, means for operating the said means, comprising a sliding block, means on the block for engaging the plunger as it moves rearwardly, and manually operated means for holding said means in inoperative position.

14. In a press of the character specified, a pressing chamber, a plunger movable therein, means for reciprocating the plunger, means for passing a plurality of baling wires transversely of the chamber, means for operating the said means, normally operative means for connecting the carriage operating means to the plunger as it moves rearwardly, manual means for holding said means in inoperative position, and a spring for returning the carriage.

15. A press comprising a pressing chamber, a plunger therein, means for reciprocating the plunger, a needle carriage having needles for passing baling wires transversely of the chamber, and movable toward and from the chamber, means for moving the carriage in one direction comprising a slidable block, normally operative means for locking the block to the plunger on its rearward movement, means for releasing the said means when the plunger reaches the end of its rearward stroke, manually operated means for holding the locking means in inoperative position, and a spring for returning the carriage.

16. A press comprising a pressing chamber, a plunger therein, means for passing baling wires transversely of the chamber, normally operative means for connecting the passing means with the plunger on its rearward stroke to operate the said means, means for releasing the connecting means at the end of the stroke of the plunger, means for holding the said connecting means in inoperative position, and a spring for returning the carriage.

JOHN H. SAWYER.

Witnesses:
G. H. KEENE,
A. D. WORLEY.